(12) United States Patent
Lee et al.

(10) Patent No.: US 7,869,017 B2
(45) Date of Patent: Jan. 11, 2011

(54) TEST APPARATUS AND TEST METHOD HAVING A PLURALITY OF COMBINATIONS OF OBJECT DISTANCES

(75) Inventors: Chang Yuan Lee, Hsin Chu County (TW); Wen Wen Teng, Hsin Chu (TW)

(73) Assignee: UMA Technology Inc., Hsinchu (TW)

( * ) Notice: Subject to any disclaimer, the term of this patent is extended or adjusted under 35 U.S.C. 154(b) by 0 days.

(21) Appl. No.: 12/541,602

(22) Filed: Aug. 14, 2009

(65) Prior Publication Data

US 2010/0141962 A1 Jun. 10, 2010

(30) Foreign Application Priority Data

Dec. 9, 2008 (TW) ................................ 097147751

(51) Int. Cl.
*G01B 9/00* (2006.01)
(52) U.S. Cl. .................................. 356/124; 356/124.5
(58) Field of Classification Search ......... 356/124–127, 356/213–218, 237.1–237.5
See application file for complete search history.

(56) References Cited

U.S. PATENT DOCUMENTS

| 5,841,525 | A * | 11/1998 | Rosow et al. | ............ 356/124.5 |
| 6,498,642 | B1 * | 12/2002 | Duckett | ...................... 356/244 |
| 2010/0165329 | A1 * | 7/2010 | Lee et al. | .................... 356/124 |

FOREIGN PATENT DOCUMENTS

| TW | 274169 | 2/2007 |
| TW | 282900 | 6/2007 |
| TW | 288838 | 10/2007 |

* cited by examiner

*Primary Examiner*—Hoa Q Pham
(74) *Attorney, Agent, or Firm*—Muncy, Geissler, Olds & Lowe, PLLC

(57) ABSTRACT

One embodiment of the invention provides an test apparatus having a plurality of combinations of object distances and being used for testing an optical device. The test apparatus comprises at least one reflector, at least one first target module and at least one second target module. The first target module is for forming a first patterned light beam being shed on the optical device. The second target module is for forming a second patterned light beam being reflected by the reflector and then shed on the optical device. The third target module is for forming a quasi-parallel third patterned light beam being shed on the optical device. The distance between the first target module and the optical device is smaller than the distance between the second target module and the optical device.

19 Claims, 12 Drawing Sheets

TEST APPARATUS AND TEST METHOD HAVING A PLURALITY OF COMBINATIONS OF OBJECT DISTANCES

BACKGROUND OF THE INVENTION (a) Field of the Invention

The invention relates to a test apparatus and a test method for testing an optical device, and more particularly, to a test apparatus and a test method for generating a plurality of combinations of object distances to test an optical device.

(b) Description of the Related Art

An optical device is wildly applied in electronic devices, such as digital camera, mobile camera phone, PC camera, PDA, toy and monitor, to capture an image. The optical device includes a lens module and an image sensor such as CMOS (Complementary Metal Oxide Semiconductor) or a CCD (Charge Coupled Device). During the manufacturing and assembly process of the lens module and the image sensor, the quality of the image captured by the optical device varies with the manufacturing difference. As a result, before delivered out of the factory, the optical device should be tested and its focal length should be adjusted so that the optical device after tested can conform to the specification of original design.

FIG. 1 shows a schematic diagram illustrating a conventional light box for testing a optical device. A conventional light box 10 for testing an optical device conforms to the specification of International Standard Organization (ISO) and Standard mobile imaging architecture (SMIA). The light box 10 can test the property of an optical device 14 such as resolution, opto-electronic conversion function (OECF), gray value, modulation transfer function (MTF), spatial frequency response, etc.

Referring to FIG. 1, the light box 10 comprises a housing 11 and a target, a light source 13, a optical device 14, a host computer 15, and an screw rod 16 which are disposed in the housing 11. For testing different properties of the optical device 14, different test charts may be formed on the target 12. For example, when the resolution of the optical device 14 is measured, the test chart conforming to ISO12233 standard may be used. During the test, light from the light source 13 shed on the target 12 is reflected to the optical device 14. The optical device 14 captures an image and transmits it to the host computer 15 which analyzes the image captured.

However, when the conventional light box 10 is used to measure focusing condition or extend deep of focus or field of the optical device 14 at different object distances, the target 12 have to be moved to change the object distance thereof by means of the screw rod 16. This is time-consuming and the extend deep of focus or field may not be able to be obtained. Especially, in order to analyzes the autofocus functions and the focusing resolution, images of the target 12 captured at different object distances are required when the optical device is tested to examine its autofocus functions or to calculate its extend deep of focus or field by using application software. Since the images need to be captured at different object distances, the testing time is relatively long.

BRIEF SUMMARY OF THE INVENTION

In light of the above-mentioned problems, one object of an embodiment of the invention is to provide a test apparatus and a test method having a plurality of combinations of object distances. One object of an embodiment of the invention is to provide a test apparatus having a relatively compact volume. One object of an embodiment of the invention is to provide a test method used in a test apparatus so that the test apparatus may have a relatively compact volume.

One embodiment of the invention provides an test apparatus having a plurality of combinations of object distances and being used for testing an optical device. The test apparatus comprises at least one reflector, at least one first target module and at least one second target module. The first target module is for forming a first patterned light beam being shed on the optical device. The second target module is for forming a second patterned light beam being reflected by the reflector and then shed on the optical device. The third target module is for forming a quasi-parallel third patterned light beam being shed on the optical device. The distance between the first target module and the optical device is smaller than the distance between the second target module and the optical device. In one embodiment, the third target module includes a light source, a target and a collimator. The light source is for generating a light beam. A test chart is formed on the target. The light beam from the light source is collimated by the collimator and becomes a quasi-parallel light beam.

One embodiment of the invention provides an test method being for generating a plurality of combinations of object distances and for testing an optical device. The test method comprising: controlling a first target module to form a first patterned light beam being shed on the optical device; controlling a second target module to form a second patterned light beam being reflected by a reflector and then shed on the optical device; and controlling a third target module to form a quasi-parallel third patterned light beam being shed on the optical device. In one embodiment, the first, second and third patterned light beams are respectively formed by a test chart form on a target of the first, second and third target modules. In one embodiment, the optical device is used to capture an image corresponding to the test charts, and analyzing the image to obtain the properties of the optical device.

An embodiment of the invention can improve the convenience of a test apparatus or a test method, and to provide a test apparatus or a test method which is more efficient than the conventional one. In addition, a test apparatus having a plurality of combinations of object distances according to an embodiment of the invention has a relatively compact volume.

Other objects and advantages of the invention can be better understood from the technical characteristics disclosed by the invention. In order to clarify the above mentioned and other objects and advantages of the invention, examples accompanying with figures are provided and described in details in the following.

DETAILED DESCRIPTION OF THE INVENTION

The above and other technical content, characteristics, and functions of the invention will be described in details with reference to the drawings. For clarity, the wording related to direction, such as up, down, left, right, front, back, etc., used in examples is referred to the direction with respect to the drawings. Therefore, the wording related to direction is not used to limit the scope of the invention.

Figure 1:
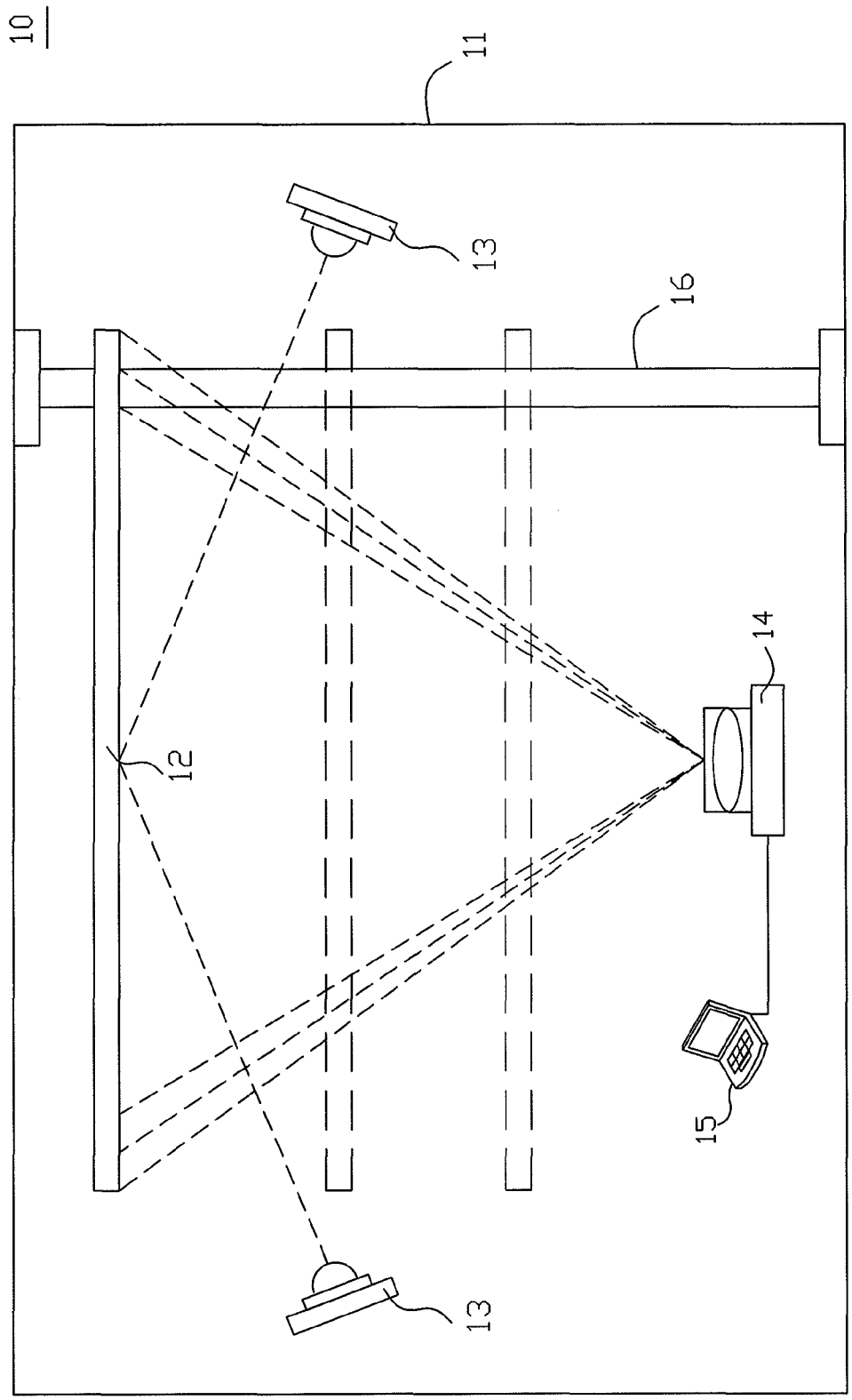
FIG. 1 shows a schematic diagram illustrating a conventional light box for testing a optical device.
Figure 2:
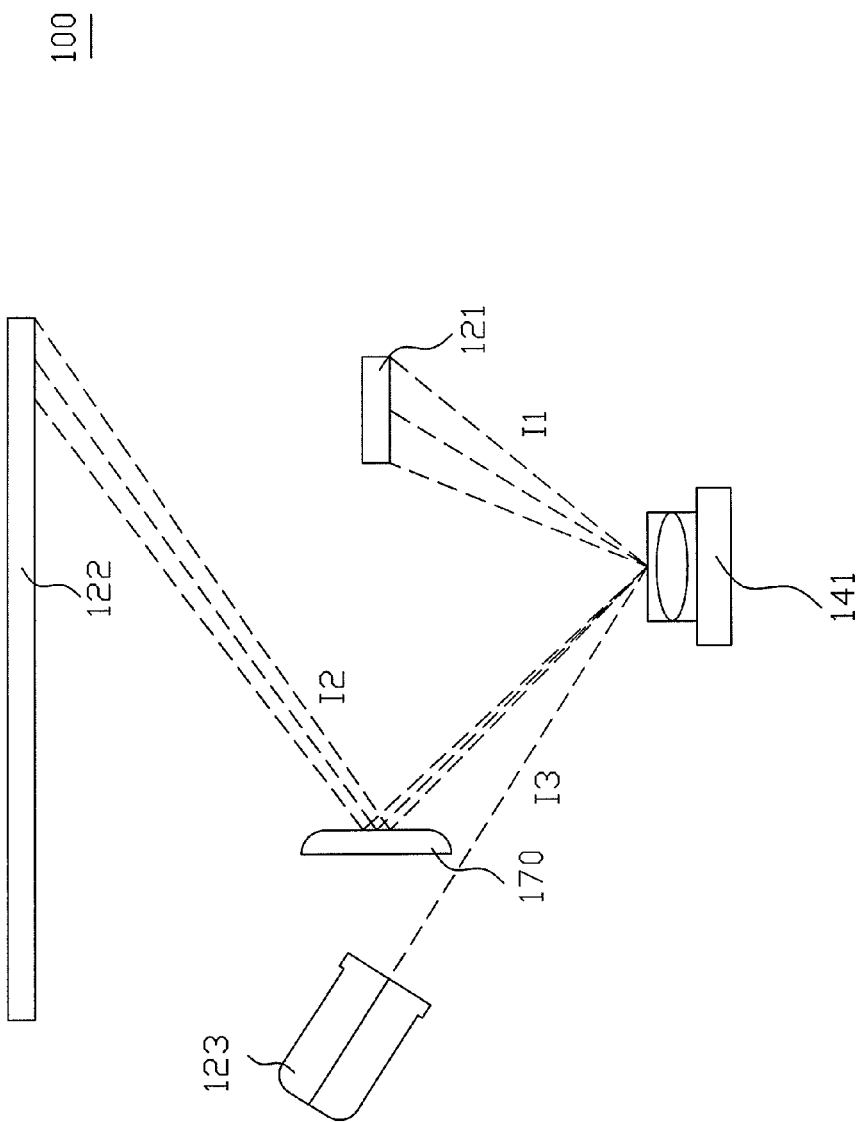
FIG. 2 shows a schematic diagram illustrating a test apparatus having a plurality of combinations of object distances according to one embodiment of the invention.

FIG. 2 shows a schematic diagram illustrating a test apparatus having a plurality of combinations of object distances according to one embodiment of the invention. The test apparatus 100 having a plurality of combinations of object distances includes a first target module 121 having a short object distance, a second target module 122 having a medium object distance and a third target module 123 having a long object distance, a reflector 170 and an optical device 141.

Figure 3A:
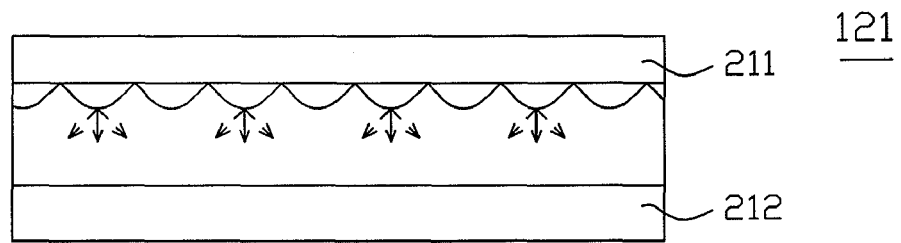
FIG. 3A shows a schematic diagram illustrating a first target module having a short object distance according to one embodiment of the invention.

FIG. 3A shows a schematic diagram illustrating a target module having a short object distance according to one embodiment of the invention. Referring to FIGS. 2 and 3A, the first target module 121 includes a light source 211 and a target 212. The light source 211 is for generating a light beam. A test chart (not shown) is formed on the target 212. A light beam from the light source 211 passes through the target 212 and becomes a first patterned light beam I1 formed by the test chart on the target 212, and then the light beam is captured by the optical device 141. The distance between the target 212 of the first target module 121 and the optical device 141 is an object distance D1.

Figure 3B:
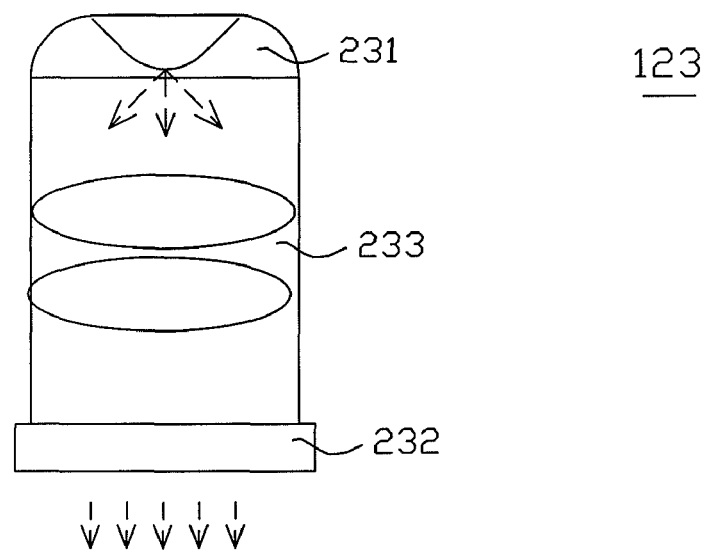
FIG. 3B shows a schematic diagram illustrating a third target module having a long object distance according to one embodiment of the invention.

FIG. 3B shows a schematic diagram illustrating a target module having a long object distance according to one embodiment of the invention. Referring to FIGS. 2 and 3B, the third target module 123 includes a light source 231, a target 232 and a collimator 233. The light source 231 is for generating a light beam. A test chart (not shown) is formed on the target 232. A light beam from the light source 231 is collimated by the collimator 233 and becomes a quasi-parallel light beam. The quasi-parallel light beam passes through the target 232, becomes a third patterned light beam I3 formed by the test chart on the target 232, and then is captured by the optical device 141. The collimator 233 can simulate an object distance at infinity between the target 232 of the third target module 123 and the optical device 141.

Figure 3C:
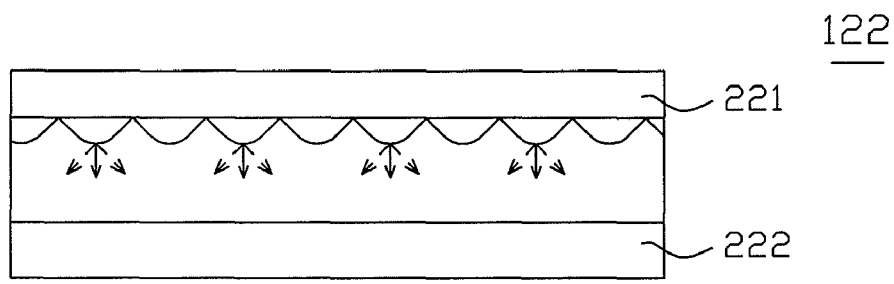
FIG. 3C shows a schematic diagram illustrating a second target module having a medium object distance according to one embodiment of the invention.

FIG. 3C shows a schematic diagram illustrating a target module having a medium object distance according to one embodiment of the invention. Referring to FIGS. 2 and 3C, the second target module 122 includes a light source 221 and a target 222. The light source 221 is for generating a light beam. A test chart (not shown) is formed on the target 222. A light beam from the light source 221 passes through the target 222 and becomes a second patterned light beam I2 formed by the test chart on the target 222. The patterned light beam I2 is then reflected by the reflector 170 and captured by the optical device 141. The distance between the target 222 of the second target module 122 and the optical device 141 is an object distance D2. The object distance D2 is longer than object distance D1. The required width of the second target module 122 may be effectively reduced by the provision of the reflector 170. Compared with the conventional art, the design in the FIGS. 3A to 3C may simplify the arrangement of the components in a test apparatus having a plurality of combinations of object distances (as aftermentioned).

Figure 4:
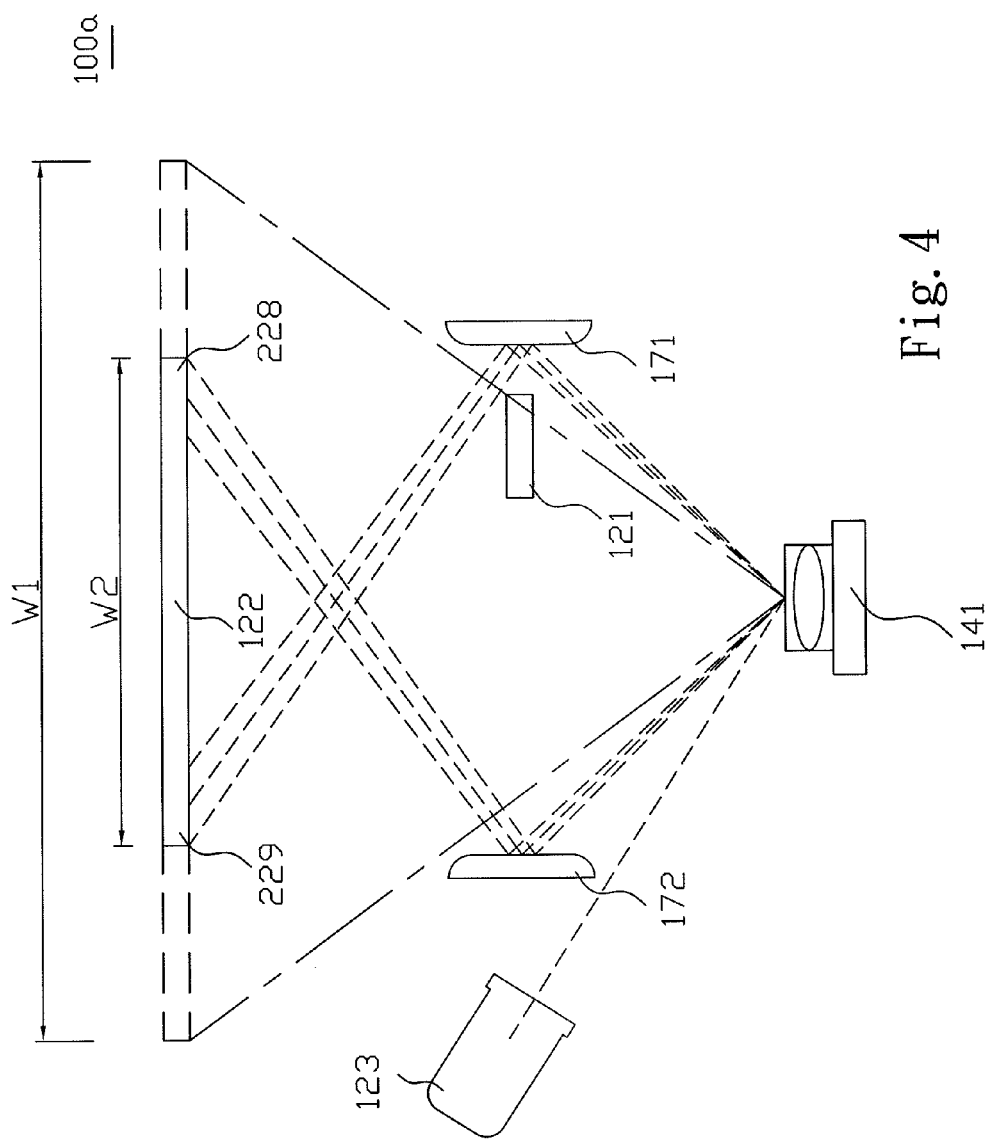
FIG. 4 shows a schematic diagram illustrating a test apparatus utilizing at least a reflector to generate a plurality of combinations of object distances according to one embodiment of the invention.

FIG. 4 shows a schematic diagram illustrating a test apparatus utilizing at least a reflector to generate a plurality of combinations of object distances according to one embodiment of the invention. The test apparatus 100a having a plurality of combinations of object distances in FIG. 4 is similar to test apparatus 100 in FIG. 2, and therefore the same numerical reference designates the same member in these test apparatus and the descriptions of the same members will be omitted. Only the difference between these test apparatus will be described in the followings. As shown in FIG. 4, test apparatus 100a having a plurality of combinations of object distances includes a first reflector 171 and a second reflector 172 which are respectively disposed between the target 222 of the second target module 122 and the optical device 141 and are opposite each other. In case that the distance between the target 222 of the second target module 122 and the optical device 141 is an object distance D2, the width of the second target module 122 is required to be W1 in the conventional art so that the optical device 141 is able to capture enough quantity of the image to be analyzed. In this embodiment, the portion of patterned light beam I2 from the second end 229 of the target 222 of the second target module 122 is reflected by the first reflector 171 and then shed on the optical device 141. The portion of patterned light beam I2 from the first end 228 of the target 222 of the second target module 122 opposite the second end 229 is reflected by a second reflector 172 and then shed on the optical device 141. Consequently, even though the width of the target 222 in this embodiment is set to W2 being shorter than W1, the optical device 141 may also capture enough quantity of the image to be analyzed. This may reduces the volume of the test apparatus 100a having a plurality of combinations of object distances.

Figure 5:
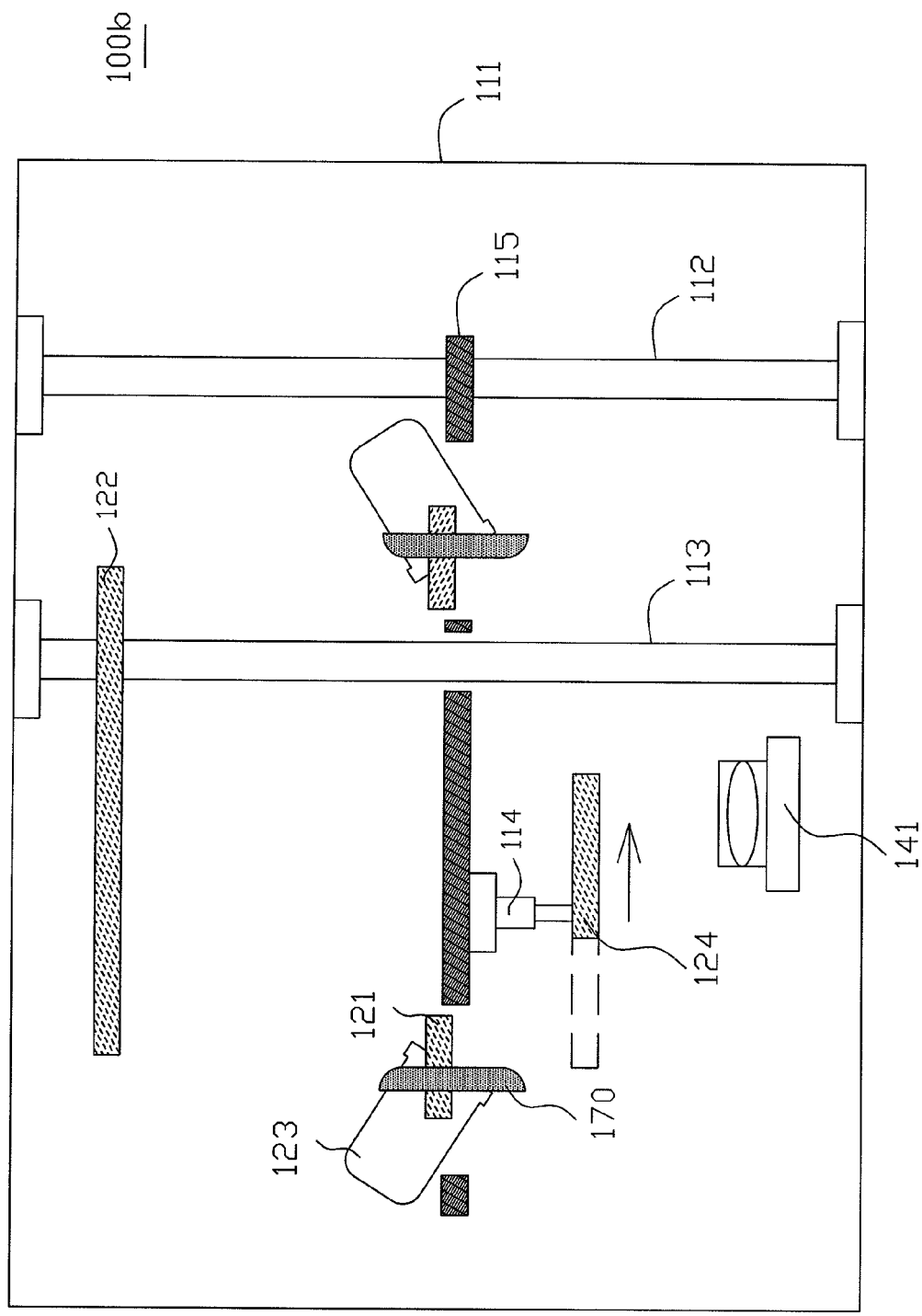
FIG. 5 shows a schematic side view illustrating the inside of a test apparatus having a plurality of combinations of object distances according to one embodiment of the invention.
Figure 6:
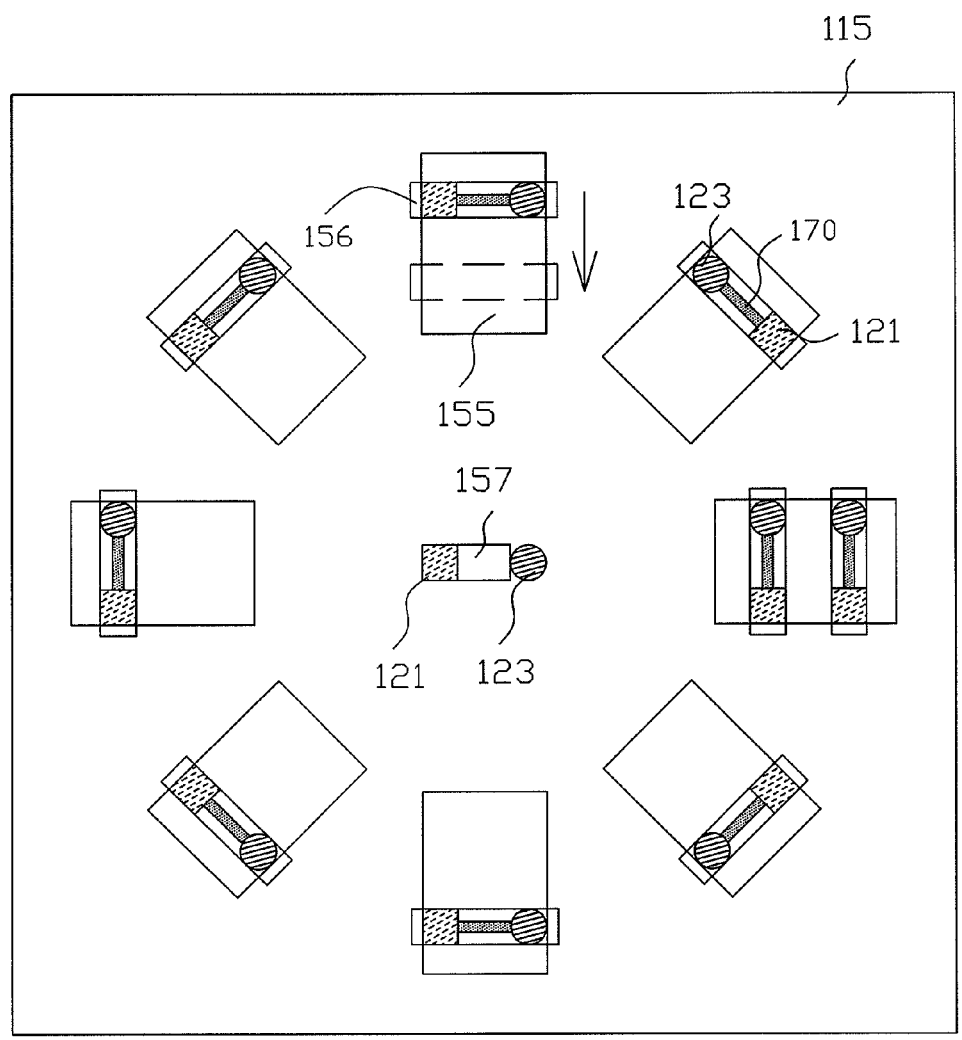
FIG. 6 shows a schematic top view of a loading platform of a test apparatus having a plurality of combinations of object distances according to one embodiment of the invention.

FIG. 5 shows a schematic side view illustrating the inside of a test apparatus having a plurality of combinations of object distances according to one embodiment of the invention. FIG. 6 shows a schematic top view of a loading platform of a test apparatus having a plurality of combinations of object distances according to one embodiment of the invention. The test apparatus 100b having a plurality of combinations of object distances in FIG. 5 is similar to test apparatus 100 in FIG. 2, and therefore the same numerical reference designates the same member in these test apparatus and the descriptions of the same members will be omitted. Only the difference between these test apparatus will be described in the followings. In this embodiment, referring to the FIGS. 5 and 6, the test apparatus 100b having a plurality of combinations of object distances includes a housing 111 and a first displacement-generating device, at least one first target module 121 having a short object distance, at least one second target module 122 having a medium object distance and at least one third target module 123 having a long object distance, at least one reflector 170 and at least one optical device 141 which are disposed in the housing 11. The first displacement-generating device is for moving the reflector 170, the first target module 121 and the second target module 122 relative to the optical device 141. In this embodiment, the displacement-generating device includes a loading platform 115, a first screw rod 112 and a second screw rod 113. The first screw rod 112 and the second screw rod 113 are secured on the housing 111. The second target module 122 is movably disposed at the second screw rod 113 so that the second target module 122 may be moved by means of the second screw rod 113. The loading platform 115 is movably disposed at the first screw rod 112 and between the second target module 122 and the optical device 141. The reflectors 170, the first target modules 121 and the third target modules 123 are disposed on the loading platform 115. Referring to FIG. 6, the loading platform 115 includes at least one slide groove 155 and at least one carrier 156. The loading platform 115 defines the slide grooves 155 which pass through the loading platform 115. The reflectors 170, the first target modules 121 and the third target modules 123 are secured on the carriers 156. The carriers 156 are movably disposed within the slide grooves 155 so that the carriers 156 may be moved within the slide grooves 155 forward or backward relative to the center of the loading platform 115. Consequently, different extend deeps of focus or field of the optical device 141 may be measured.

Figure 7:
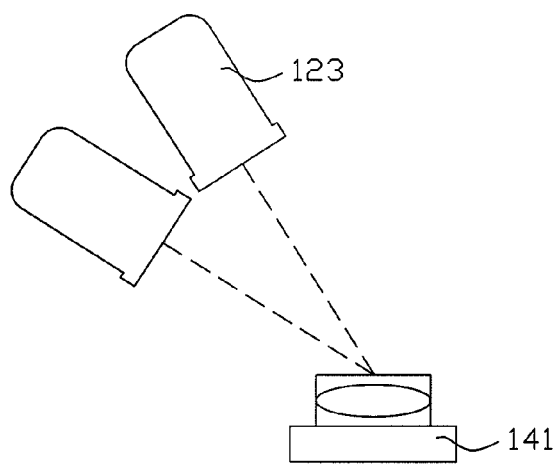
FIG. 7 shows a schematic diagram illustrating a target module having a long object distance and an optical device viewing at different viewing angles.

FIG. 7 shows a schematic diagram illustrating a target module having a long object distance and an optical device viewing at different viewing angles. As shown in FIG. 7, in one embodiment, the third target module 123 is rotatably disposed at the carrier 156 so that the third target module 123 may be adjusted to be at an appropriate viewing angle.

Referring to FIG. 5, the test apparatus 100b having a plurality of combinations of object distances may further includes a fourth target module 124 having a shorter object distance and a second displacement-generating device 114. The second displacement-generating device 114 is disposed on the side surface of the loading platform 115 adjacent to the optical device 141, and it may optionally move the fourth target module 124 between the loading platform 115 and the optical device 141. The structure of the second displacement-generating device 114 is not limited in the present invention; the second displacement-generating device 114 may include a motor and a connecting rod (not shown). The fourth target module 124 is secured at the connecting rod. The motor and the connecting rod are connected through a saw teeth structure so that the motor may drive the connecting rod to move forward and backward. In another embodiment, the motor may rotate the connecting rod and drives the fourth target module 124 to rotate so that the fourth target module 124 may be optionally located between the loading platform 115 and the optical device 141.

Figure 8:
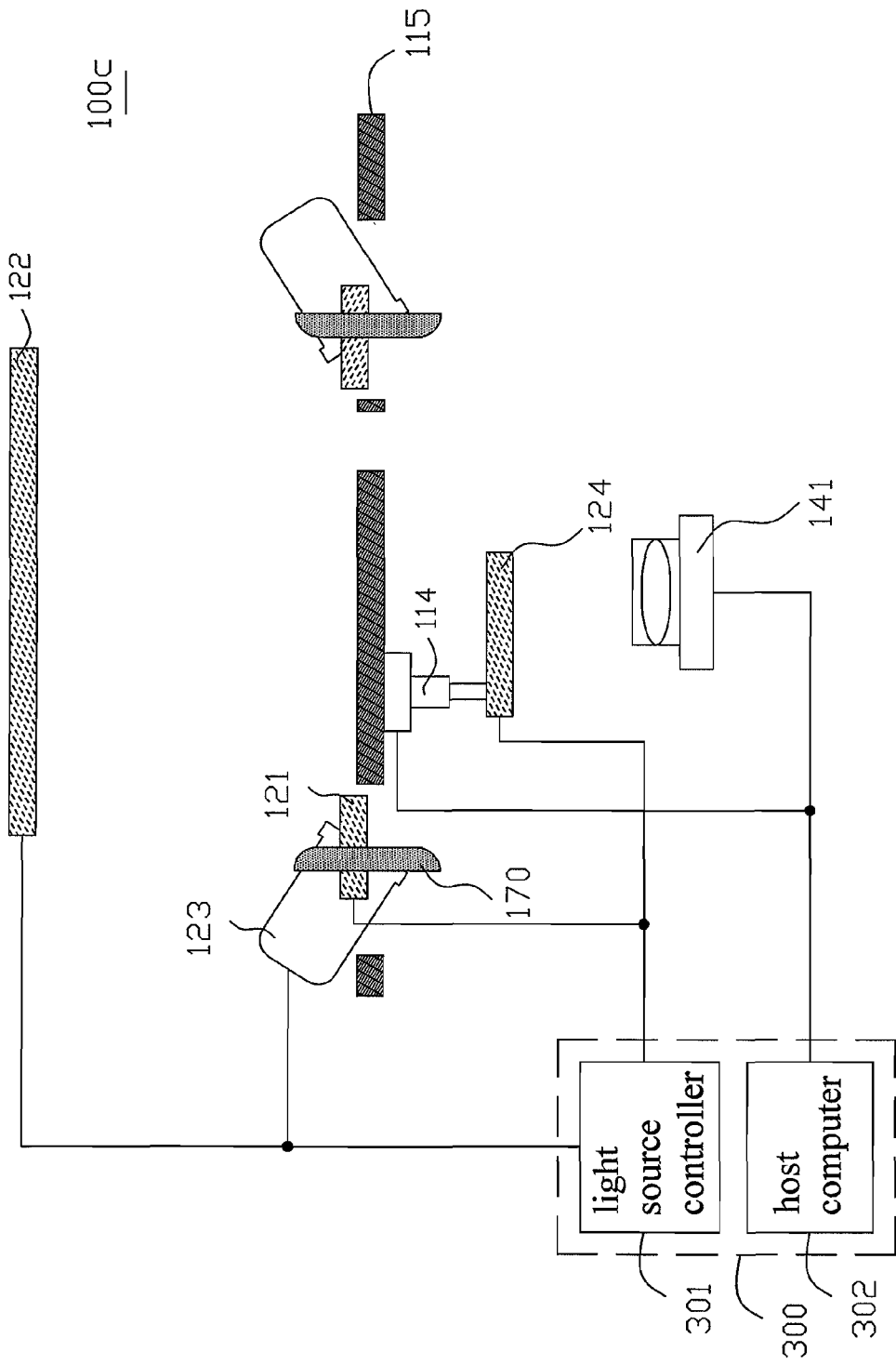
FIG. 8 shows a schematic diagram illustrating a test apparatus having a plurality of combinations of object distances according to one embodiment of the invention.

FIG. 8 shows a schematic diagram illustrating a test apparatus having a plurality of combinations of object distances according to one embodiment of the invention wherein the control system is represented by a functional block. The test apparatus 100c having a plurality of combinations of object distances in FIG. 8 is similar to test apparatus 100b in FIG. 5, and therefore the same numerical reference designates the same member in these test apparatus and the descriptions of the same members will be omitted. Only the difference between these test apparatus will be described in the followings. For simplicity, the members such as screw rod are omitted. In this embodiment, test apparatus 100c having a plurality of combinations of object distances may further includes a control system 300. The control system 300 includes a light source controller 301 and a host computer 302. The light source controller 301 is coupled to the first target module 121, the second target module 122, the third target module 123 and the fourth target module 124. The host computer 302 may be a computer having calculating functions and is coupled to the optical device 141 and the second displacement-generating device 114. The test apparatus 100c having a plurality of combinations of object distances is controlled by the control system 300 and may perform a test method for testing an optical device 141.

Figure 9:
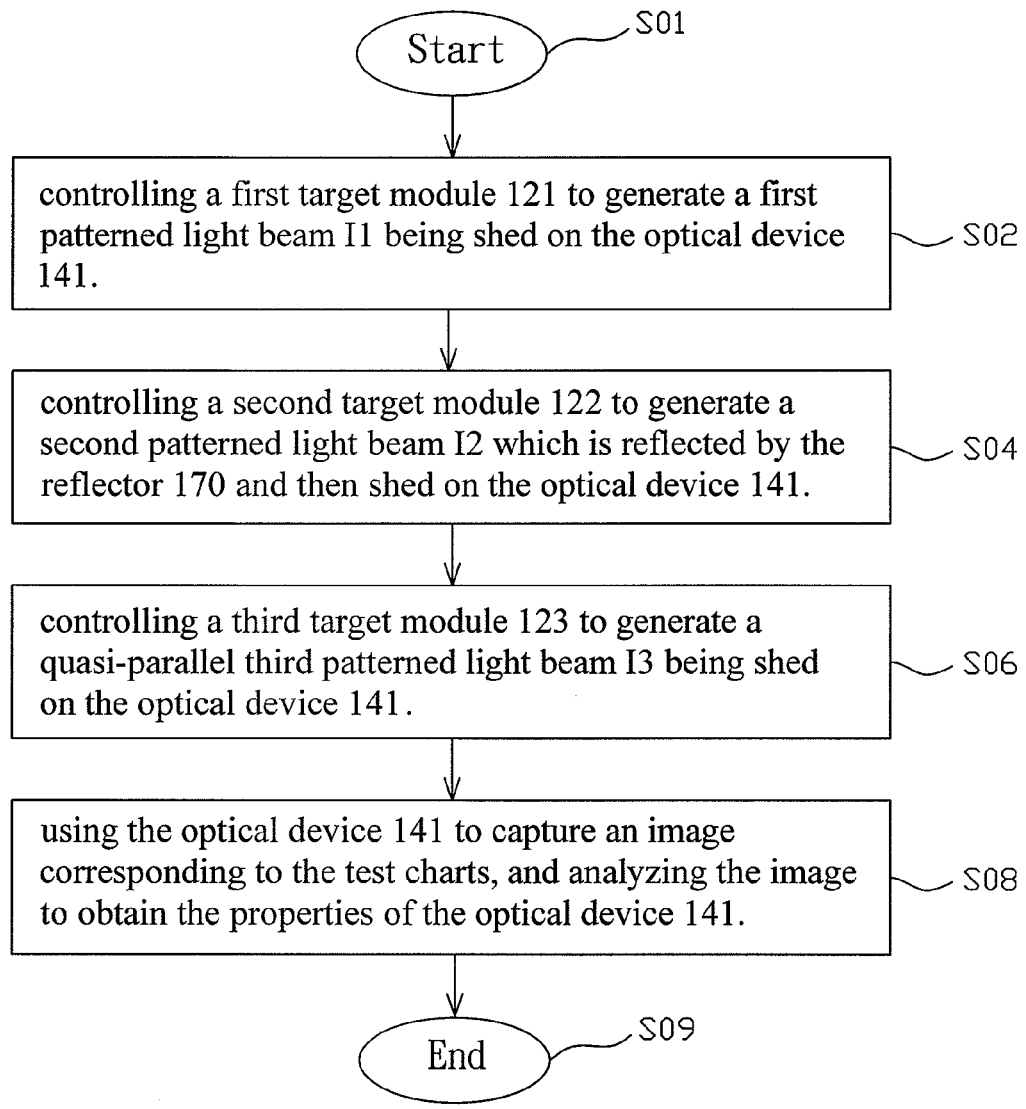
FIG. 9 shows a flow chart illustrating a test method for testing an optical device according to one embodiment of the invention.

FIG. 9 shows a flow chart illustrating a test method for testing an optical device according to one embodiment of the invention. The test method may test the focusing capability of an optical device having autofocus functions. The method comprises the following steps.

Step 01: Start.

Step 02: controlling a first target module 121 to generate a first patterned light beam I1 being shed on the optical device 141. In one embodiment, the first patterned light beam I1 is formed by the test chart on the target 212 of the first target module 121.

Step 04: controlling a second target module 122 to generate a second patterned light beam I2 which is reflected by the reflector 170 and then shed on the optical device 141. In one embodiment, the second patterned light beam I2 is formed by the test chart on the target 222 of the second target module 122.

Step 06: controlling a third target module 123 to generate a quasi-parallel third patterned light beam I3 being shed on the optical device 141. In one embodiment, the third patterned light beam I3 is formed by the test chart on the target 232 of the third target module 123.

Step 08: using the optical device 141 to capture an image corresponding to the test charts, and analyzing the image to obtain the properties of the optical device 141.

Step 09: End.

In addition, if the extend deeps of focus or field of optical device 141 having a constant focal length is required to be tested, Step 02, Step 04, and Step 05 may be simultaneously performed, that is, the first, second and third target modules 121, 122 and 123 are simultaneously controlled to generate the first, second, third patterned light beams I1, I2 and I3. And then, Step 08 is performed to analyze the image to obtain the extend deeps of focus or field of the optical device 141.

Figure 10A:
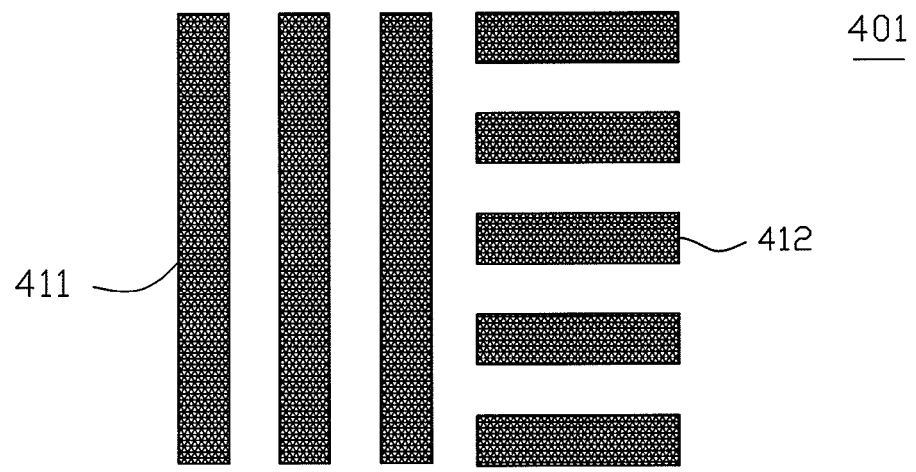
FIG. 10A shows a test chart according to one embodiment of the invention.
Figure 10B:
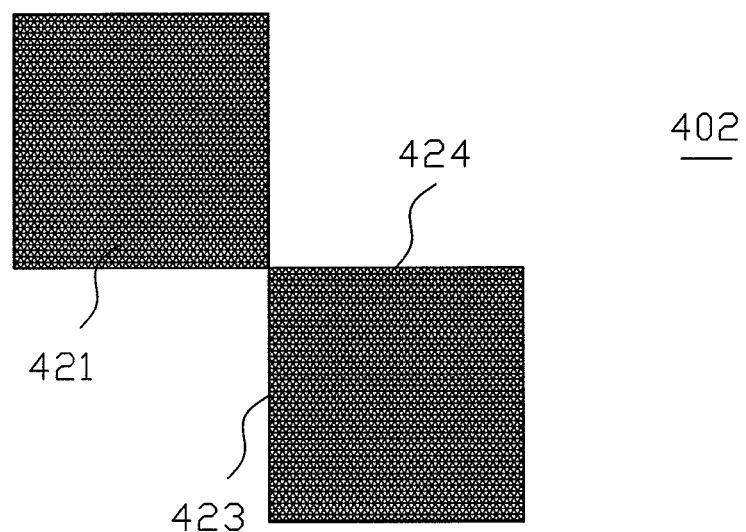
FIG. 10B shows a test chart according to one embodiment of the invention.
Figure 10C:
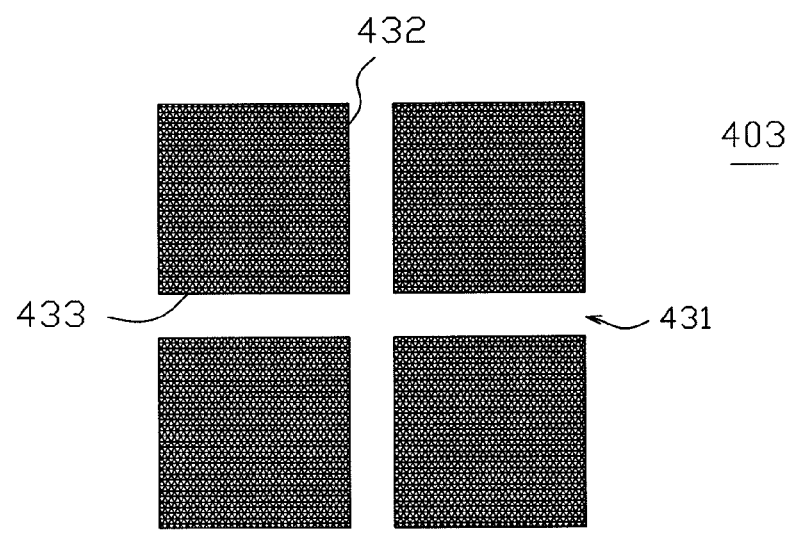
FIG. 10C shows a test chart according to one embodiment of the invention.

FIG. 10A to 10C respectively shows a test chart according to one embodiment of the invention. The test method according to this embodiment may test the properties of the optical device 141. The test method of using the test chart 401 to test the characteristics of modulation transfer functions and using the test charts 402 and 403 to test the characteristics of spatial frequency responses is described in the following as an example.

As shown in FIG. 10A, the test chart 401 includes a plurality of first stripes 411 extending along the vertical direction and a plurality of second stripes 412 extending along the horizontal direction, where the vertical direction is perpendicular to the horizontal direction. In order to get a relatively good test result, the first and second stripes 411 and 412 are black and are disposed on a white surface. Step 08 in this embodiment for analyzing the image may comprise the following step (not shown).

Step 81: calculating a modulation transfer function in a vertical direction and a horizontal direction. The modulation transfer function is (Max−Min)/(Max−Min), where Max is the largest brightness value of the image and Min is the smallest brightness value of the image.

As shown in FIG. 10B, the test chart 402 includes a plurality of squares 421. The borders 423 and 424 of the squares 421 respectively extend along the vertical direction and the horizontal direction. In order to obtain a relatively good test result, the squares 421 are black and are disposed on a white surface. Step 08 in this embodiment for analyzing the image may comprise the following step (not shown).

Step 82: calculating edge spread functions of the borders in the vertical direction and the horizontal direction.

Step 83: calculating a line spread function by differentiating the edge spread functions.

Step 84: calculating a spatial frequency response by conducting a fourier transform on the line spread function.

As shown in FIG. 10C, the test chart 403 includes a cross area 431. The borders 432 and 433 of the cross area 431 respectively extend along the vertical direction and the horizontal direction. In order to obtain a relatively good test result, the cross area 431 are black and are disposed on a white surface. Step 08 in this embodiment for analyzing the image may comprise the following step (not shown).

Step 85: calculating a line spread function in the vertical direction and the horizontal direction.

Step 86: calculating a spatial frequency response by conducting a fourier transform on the line spread function.

An object of an embodiment of the invention is to improve the convenience of a test apparatus or a test method, and to provide a test apparatus or a test method which is more efficient than the conventional one. In one embodiment, a reflector is disposed adjacent to a first target module having a short object distance. A second target module having a medium object distance is disposed at the place on which the light beam reflected by the reflector can be shed so that the light path is extended. A third target module having a long object distance is disposed adjacent to the reflector. The third target module includes a collimator capable of collimating the light and simulating an object distance at infinity. Consequently, the test apparatus and method may have third object distances. In one embodiment, the target modules and reflector may be disposed at a first displacement-generating device which can adjust the highs thereof so that the object distances are varied. In one embodiment, a control system is provided to satisfy different test requests in various modes.

Figure 11:
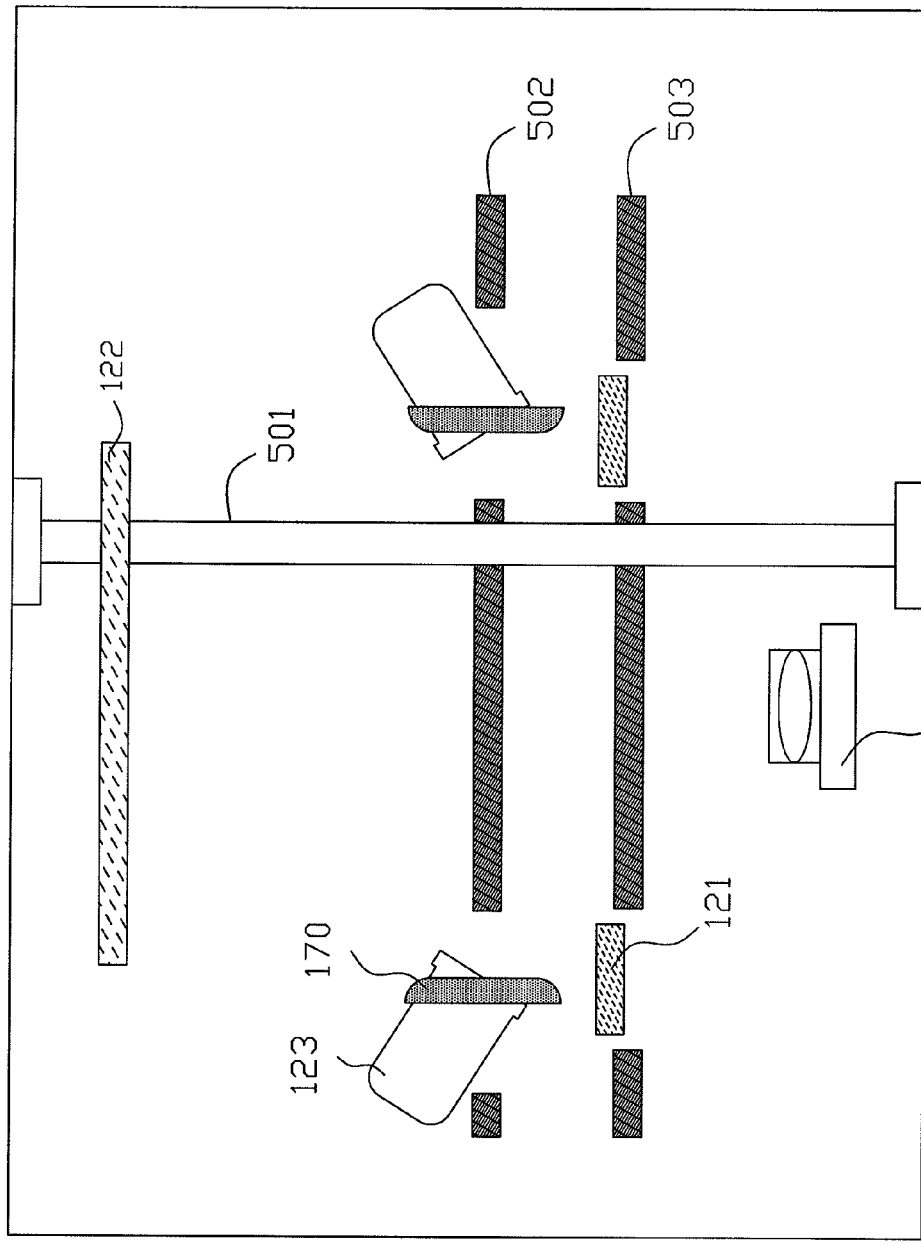
FIG. 11 shows a schematic side view illustrating the inside of a test apparatus having a plurality of combinations of object distances according to one embodiment of the invention.

Note that the first displacement-generating device is not limited to the structure shown in FIG. 5. FIG. 11 shows a schematic side view illustrating the inside of a test apparatus having a plurality of combinations of object distances according to one embodiment of the invention. The test apparatus 100*d* having a plurality of combinations of object distances in FIG. 11 is similar to test apparatus 100*b* in FIG. 5, and therefore the same numerical reference designates the same member in these test apparatus and the descriptions of the same members will be omitted. Only the difference between these test apparatus will be described in the followings. As shown in FIG. 11, the displacement-generating device includes a first loading platform 502, a second loading platform 503 and a screw rod 501. The second target module 122, the first loading platform 502 and the second loading platform 503 are movably disposed at the screw rod 501. The first loading platform 502 is disposed between the second target module 122 and the optical device 141. The second loading platform 503 is disposed between the first loading platform 502 and the optical device 141. The reflector 170 and the third target module 123 are disposed on the first loading platform 502, and the first target module 121 is disposed on the second loading platform 503.

Although the preferred embodiments of the present invention has been fully described by way of examples with reference to the accompanying drawings, it should not be construed as any limitation on the implementation range of the invention. Various equivalent changes and modifications can be performed by those who are skilled in the art without deviating from the scope of the invention. The scope of the present invention is to be encompassed by the claims of the present invention. Any embodiment or claim of the present invention does not need to reach all the disclosed objects, advantages, and uniqueness of the invention. Besides, the abstract and the title are only used for assisting the search of the patent documentation and should not be construed as any limitation on the implementation range of the invention.

What is claimed is:

1. An test apparatus having a plurality of combinations of object distances and being used for testing an optical device, the test apparatus comprising:
   at least one reflector;
   at least one first target module forming a first patterned light beam being shed on the optical device;
   at least one second target module forming a second patterned light beam being reflected by the reflector and then shed on the optical device; and
   at least one third target module forming a quasi-parallel third patterned light beam being shed on the optical device,
   wherein the distance between the first target module and the optical device is smaller than the distance between the second target module and the optical device.

2. The test apparatus according to claim 1, wherein the first target module and the second module respectively comprise:
   a light source for generating a light beam; and
   a target on which a test chart is disposed,
   wherein the light beams pass through the test charts and respectively become the first patterned light beam and the second patented light beam formed by the test charts.

3. The test apparatus according to claim 1, wherein the first target module and the second module respectively comprises:
   a light source for generating a light beam; and
   a target on which a test chart is disposed,
   wherein the light beams are reflected by the targets and respectively become the first patterned light beam and the second patented light beam formed by the test charts.

4. The test apparatus according to claim 1, wherein the third target module comprises:
   a light source for generating a light beam;
   a collimator collimating the light beam;
   a target on which a test chart is disposed,
   wherein the collimated light beam passes through the test chart of the target and becomes the third patterned light beam formed by the test chart.

5. The test apparatus according to claim 1 further comprising:
   a first displacement-generating device for moving at least one of the reflector, the first target module and the second target module relative to the optical device.

6. The test apparatus according to claim 5 further comprising:
a control system being coupled to the first target module, the second target module, the third target module and the optical device, wherein
the control system controls the first, second and third target modules to form the first, second and third patterned light beams and receives an image captured by the optical device to analyze the image.

7. The test apparatus according to claim 5, wherein
the first displacement-generating device comprises a loading platform, a first screw rod and a second screw rod;
the second target module is movably disposed at the second screw rod;
the loading platform is movably disposed at the first screw rod and between the second target module and the optical device; and
the reflectors, the first target modules and the third target modules are disposed on the loading platform.

8. The test apparatus according to claim 7 further comprising:
a fourth target module; and
a second displacement-generating device disposed on the side surface of the loading platform adjacent to the optical device, and being for optionally moving the fourth target module between the loading platform and the optical device.

9. The test apparatus according to claim 8 further comprising a control system, wherein the control system comprises:
a light source controller coupled to the first target module, the second target module, the third target module and the fourth target module; and
a host computer coupled to the optical device and the second displacement-generating device.

10. The test apparatus according to claim 7, wherein the loading platform comprising
at least one slide groove passing through the loading platform; and
at least one carrier movably disposed within the slide groove, wherein the reflector, the first target module and the third target module are secured on the carrier.

11. The test apparatus according to claim 10, wherein a plurality of carriers are movably disposed within the slide groove.

12. The test apparatus according to claim 5, wherein
the first displacement-generating device comprises a first loading platform, a second loading platform and a screw rod;
the second target module, the first loading platform and the second loading plat are movably disposed at the second screw rod;
the first loading platform is disposed between the second target module and the optical device;
the second loading platform is disposed between the first loading platform and the optical device;
the reflector and the third target module are disposed on the first loading platform; and
the first target module is disposed on the second loading platform.

13. An test method being for generating a plurality of combinations of object distances and for testing an optical device, the test method comprising:
controlling a first target module to form a first patterned light beam being shed on the optical device;
controlling a second target module to form a second patterned light beam being reflected by a reflector and then shed on the optical device; and
controlling a third target module to form a quasi-parallel third patterned light beam being shed on the optical device.

14. The test method according to claim 13, wherein the test method simultaneously controls the first, second and third target modules to form the first, second and third patterned light beams.

15. The test method according to claim 13, wherein the first, second and third patterned light beams are respectively formed by a test chart form on a target of the first, second and third target modules.

16. The test method according to claim 15 further comprising:
using the optical device to capture an image corresponding to the test charts, and analyzing the image to obtain the properties of the optical device.

17. The test method according to claim 16, wherein the test charts comprises a plurality of first stripes extending along a first direction and a plurality of second stripes extending along a second direction perpendicular to the first direction; and the step of analyzing the image comprises:
calculating a modulation transfer function in the first direction and the second direction wherein the modulation transfer function is (Max−Min)/(Max−Min), Max is the largest brightness value of the image and Min is the smallest brightness value of the image.

18. The test method according to claim 16, wherein the test charts comprises a plurality of squares, wherein the borders of the squares 421 respectively extend along a first direction and along a second direction; the first direction is perpendicular to the second direction; and the step of analyzing the image comprises:
calculating edge spread functions of the borders in the first direction and the second direction;
calculating a line spread function by differentiating the edge spread functions; and
calculating a spatial frequency response by conducting a fourier transform on the line spread function.

19. The test method according to claim 16, wherein the test charts comprises a cross area, wherein the borders of the cross area respectively extend along a first direction and along a second direction perpendicular to the first direction; and the step of analyzing the image comprises:
calculating a line spread function in the first direction and the second direction; and
calculating a spatial frequency response by conducting a fourier transform on the line spread function.

* * * * *